United States Patent
Wang et al.

(10) Patent No.: US 11,734,960 B2
(45) Date of Patent: Aug. 22, 2023

(54) MOBILE SENSING AND SMART PAYMENT SYSTEM

(71) Applicants: Fangsong Wang, Palo Alto, CA (US); Haigang Feng, San Diego, CA (US); Yinqing Zhao, Palo Alto, CA (US)

(72) Inventors: Fangsong Wang, Palo Alto, CA (US); Haigang Feng, San Diego, CA (US); Yinqing Zhao, Palo Alto, CA (US)

(73) Assignee: Fangsong Wang, Palo Alto, CA (US)

( * ) Notice: Subject to any disclaimer, the term of this patent is extended or adjusted under 35 U.S.C. 154(b) by 39 days.

(21) Appl. No.: 17/217,677

(22) Filed: Mar. 30, 2021

(65) Prior Publication Data

US 2021/0272383 A1    Sep. 2, 2021

Related U.S. Application Data

(63) Continuation-in-part of application No. 15/902,577, filed on Feb. 22, 2018, now Pat. No. 10,964,125.

(51) Int. Cl.
*G07B 15/02* (2011.01)
*G07B 15/06* (2011.01)
(Continued)

(52) U.S. Cl.
CPC ......... *G07B 15/063* (2013.01); *G06Q 20/327* (2013.01); *G06Q 20/4014* (2013.01);
(Continued)

(58) Field of Classification Search
CPC ... H04L 67/12; H04W 40/22; G06Q 20/4014; G06Q 20/327; G06Q 30/0284; G07B 15/02; G07B 15/063
See application file for complete search history.

(56) References Cited

U.S. PATENT DOCUMENTS 10,163,178 B1    12/2018  Sprogis
2007/0258420 A1  11/2007  Alizadeh-Shabdiz
(Continued)

FOREIGN PATENT DOCUMENTS

CN       106682891 A     5/2017

OTHER PUBLICATIONS

Sun, Lin et al., Mobile Device Passive Localization Based on IEEE 802.11 Probe Request Frames, Hindawi Mobile Information Systems vol. 2017, https://www.hindawi.com/journals/misy/2017/7821585/ (Year: 2017).*

(Continued)

*Primary Examiner* — Resha Desai
*Assistant Examiner* — Michelle E Carey

(57) ABSTRACT

A mobile sensing and payment method and system for parking fees is disclosed. The system includes an array of identity information collection modules in a parking facility. A background data processor collects mobile terminal identification information from a mobile terminal of a person entering the parking facility while the mobile terminal performs cell reselection. The data processor simultaneously senses transmission intensity of the mobile terminal using the terminal identity information collection modules. The data processor determines a location of the mobile terminal based upon the changes in the signal transmission intensity from the collection modules. The data processor generates a specific characteristic threshold for the mobile terminal to pass an entrance gate. The data processor causes the entrance gate to be opened records a specific time that the entrance gate is opened. The data processor records a specific time that the person has entered the parking facility.

18 Claims, 6 Drawing Sheets

(51) Int. Cl.
  *G06Q 30/02* (2023.01)
  *G06Q 30/0283* (2023.01)
  *H04W 40/22* (2009.01)
  *G06Q 20/40* (2012.01)
  *H04L 67/12* (2022.01)
  *G06Q 20/32* (2012.01)

(52) U.S. Cl.
  CPC ......... *G06Q 30/0284* (2013.01); *G07B 15/02* (2013.01); *H04L 67/12* (2013.01); *H04W 40/22* (2013.01)

(56) References Cited

U.S. PATENT DOCUMENTS

| | | |
|---|---|---|
| 2012/0042575 A1 | 2/2012 | Ganguly |
| 2012/0066034 A1 | 3/2012 | Nolan |
| 2013/0115969 A1 | 5/2013 | Holmes |
| 2013/0273938 A1 | 10/2013 | Ng |
| 2014/0160963 A1 | 6/2014 | Alizadeh-Shabdiz |
| 2014/0176310 A1 | 6/2014 | Kotlicki |
| 2014/0278616 A1 | 9/2014 | Stone |
| 2014/0370917 A1 | 12/2014 | Buchheim |
| 2015/0073883 A1 | 3/2015 | Chan |
| 2015/0227923 A1 | 8/2015 | Kutsch |
| 2015/0279213 A1* | 10/2015 | Balter .................... G08G 1/147 705/13 |
| 2015/0294515 A1 | 10/2015 | Bergdale |
| 2015/0369618 A1* | 12/2015 | Barnard ................ H04W 84/18 701/491 |
| 2016/0055689 A1 | 2/2016 | Raina |
| 2016/0055697 A1* | 2/2016 | Raina ....................... G07C 9/15 340/5.7 |
| 2017/0329777 A1 | 11/2017 | Vlugt |
| 2018/0005471 A1* | 1/2018 | Karam ............... G07C 9/00896 |
| 2018/0034569 A1 | 2/2018 | Gilberton |
| 2018/0059208 A1 | 3/2018 | Hamada |
| 2018/0128638 A1* | 5/2018 | Lei ......................... G06Q 30/06 |
| 2018/0144563 A1 | 5/2018 | Reymann |

OTHER PUBLICATIONS

Mohankumar, D., "Mobile Phone Communication. How it works?," Electro Schematics, https://www.electroschematics.com/mobile-phone-how-it-works, 2010.

* cited by examiner

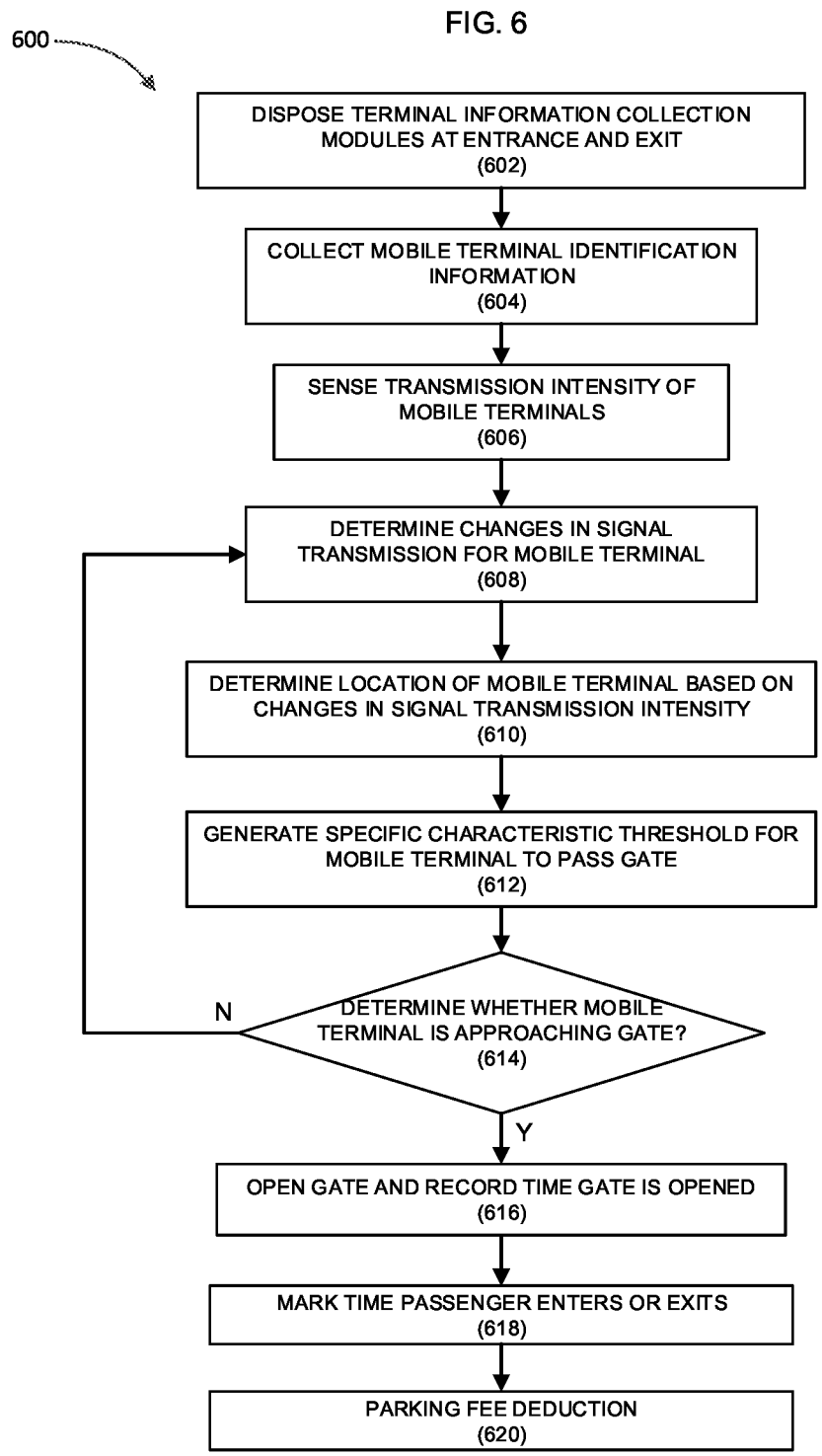

MOBILE SENSING AND SMART PAYMENT SYSTEM

PRIORITY CLAIM

This application is a continuation in part of U.S. patent application Ser. No. 15/902,577 filed Feb. 22, 2018. The contents of that application are hereby incorporated by reference in their entirety.

TECHNICAL FIELD

The present disclosure relates generally to smart payment, and in particular, to automated parking fee management.

BACKGROUND

At present, subway passenger transportation systems across China have built a relatively robust ticket purchase system, substantially achieved informatized management, and introduced payment systems for reading IC cards at gate machines, automatically calculating fares, and carrying out fare deduction. However, for passengers not having pre-purchased IC cards, process to purchase tickets can still be complex and time-consuming, especially during holidays and festivals when there is a large crowd. For an example, passengers have to go to ticket booths located at a ticket hall of a subway station to purchase tickets. A passenger can select a destination on a user interface of a self-service ticketing system that shows available stations covered by the subway network, and, upon payment, get an equivalent electronic ticket token. The passenger can then use the ticket token to enter a start station, and get out from a destination station. Thus, when passengers get in and out of gate machines at subway stations the current subway systems all require the passengers to take out their metro cards or ticket tokens in advance, and actively swipe the metro cards, or insert ticket tokens.

However, in such subway systems, unexpected delays in swiping the metro cards or inserting ticket tokens from individual passengers may block passenger flows in and out of subway stations. For an example, a passenger may have both hands occupied, when the passenger reaches a gate machine. The passenger has to put down articles first before take out a metro card, or insert a ticket token. For another example, a passenger may need to find a metro card, or insert a ticket token, when the passenger reaches a gate machine. Or the passenger may have accidentally lost his/her metro card, or ticket token.

Similar issues arise in automated parking systems that requires parkers to have a card or other token to provide a parking fee. Therefore, it is desirable to provide a more convenient and rapid sensing and payment system at parking facilities.

SUMMARY

Systems and methods in accordance with various examples of the present disclosure provide a mobile sensing and smart payment system. One disclosed example is a computer-implemented method for facilitating payment of a parking fee. A terminal identity information collection array is disposed along entering and exiting routes at a parking facility. The terminal identity information collection array includes a plurality of terminal identity information collection modules. Mobile terminal identification information is received in the course of a specific mobile terminal periodically performing cell reselection. The specific mobile terminal periodically performs cell reselection to a base station of a wireless communication network using standard communication protocols. The mobile terminal communicates messages with other mobile terminals in the wireless communication network. The wireless communication network includes multiple base stations relaying message communications between mobile terminals. Mobile terminal identification information is collected from the specific mobile terminal performing cell reselection. The specific mobile terminal is of a newly arrived person driving a car into the parking facility. Transmission intensity of the specific mobile terminal is simultaneously sensed using the plurality of terminal identity information collection modules. Changes in signal transmission intensity of the specific mobile terminal is determined via a mobile terminal sensing system. A location of the specific mobile terminal based upon the changes in the signal transmission intensity of the specific mobile terminal is determined. A specific characteristic threshold for the specific mobile terminal to pass an entrance gate of the parking facility is generated based upon the position of the specific mobile terminal and the changes in the signal transmission intensity of the specific mobile terminal via the mobile terminal sensing system. It is determined that the specific mobile terminal is approaching the entrance gate of the parking facility via the mobile terminal sensing system. The entrance gate of the start station is opened for the person carrying the specific mobile terminal, and a specific time that the entrance gate of the parking facility is opened is recorded for the specific mobile terminal. The entrance of the person carrying the specific mobile terminal to parking facility at the specific time is recorded via the mobile terminal sensing system.

Another disclosed example is a mobile sensing and payment system for automatic assignment of parking fees. The system includes a terminal identity information collection array along an entrance route and an exit route of a parking facility. The terminal identity information collection array includes a plurality of terminal identity information collection modules. A background data processor is coupled to the terminal identity information collection array. The background data processor is configured to collect mobile terminal identification information from a specific mobile terminal performing cell reselection. The specific mobile terminal is of a newly arrived person at the entrance route. The specific mobile terminal periodically performs cell reselection to a base station of a wireless communication network using a standard communication protocol. The mobile terminal communicates messages with other mobile terminals in the wireless communication network. The wireless communication network includes multiple base stations relaying message communications between mobile terminals. The specific mobile terminal transmits mobile terminal identification information in the course of the specific mobile terminal periodically performing cell reselection. The data processor simultaneously senses transmission intensity of the specific mobile terminal using the terminal identity information collection modules. The data processor determines changes in signal transmission intensity of the specific mobile terminal. The data processor determines a location of the specific mobile terminal based upon the changes in the signal transmission intensity of the specific mobile terminal. The data processor generates a specific characteristic threshold for the specific mobile terminal to pass an entrance gate at the entrance route, based upon the position of the specific mobile terminal and the changes in the signal transmission intensity of the specific mobile terminal. The data processor determines that the specific mobile terminal is approaching the entrance gate. The data processor causes the entrance gate to be opened for a person carrying the specific mobile terminal and records a specific time that the entrance gate is opened for the specific mobile terminal. The data processor records that the person carrying the specific mobile terminal has entered the parking facility at the specific time.

Another disclosed example is a non-transitory computer-readable storage medium including instructions that, when executed by at least one processor of a mobile sensing and payment system, cause the mobile sensing and smart system to perform operations including collecting mobile terminal identification information from a specific mobile terminal performing cell reselection via a terminal identity information collection array including a plurality of terminal identity information collection modules. The specific mobile terminal is of a newly arrived person at an entrance route of a parking facility. The specific mobile terminal periodically performs cell reselection to a base station of a wireless communication network using a standard communication protocol. The mobile terminal communicates messages with other mobile terminals in the wireless communication network. The wireless communication network includes multiple base stations relaying message communications between mobile terminals. The specific mobile terminal transmits mobile terminal identification information in the course of the specific mobile terminal periodically performing cell reselection. The operations include simultaneously sensing transmission intensity of the specific mobile terminal using the plurality of terminal identity information collection modules. The operations include determining changes in signal transmission intensity of the specific mobile terminal. The operations include determining a location of the specific mobile terminal based upon the changes in the signal transmission intensity of the specific mobile terminal. The operations include generating a specific characteristic threshold for the specific mobile terminal to pass an entrance gate of the parking facility, based upon the position of the specific mobile terminal and the changes in the signal transmission intensity of the specific mobile terminal. The operations include determining that the specific mobile terminal is approaching the entrance gate. The operations include causing the entrance gate to be opened for the person carrying the specific mobile terminal, and recording a specific entry time that the entrance gate is opened for the specific mobile terminal. The operations include recording that the person carrying the specific mobile terminal has entered the parking facility at the specific time.

The present disclosure can effectively determine a charge for a person parking their car in a parking facility without a need for a corresponding person to swipe a card or insert currency in a traditional gate machine, and thus is advantageous over conventional systems.

In some examples, the terminal-identity-information-collection module comprises a wireless signal access unit configured to operate a mobile terminal identity information extraction program, a reselection and access-instruction-generation unit configured to generate and transmit a switching signal for establishing a connection between a mobile terminal and the wireless signal access unit, and a signal processing unit configured to control the reselection and access-instruction-generation unit to generate a switching signal.

In some implementations, the switching signal configuration process can control the switching signal generation unit to convert a clock signal generated by the clock generation circuit unit into a switching signal, based upon a network environment parameter. The data transmission interface unit and the data transmission processing process are operable to complete protocol data transmission between the wireless signal access unit and the signal processing unit.

In some examples, the wireless signal access unit comprises an antenna, a signal sensing and control unit and a data transmission interface unit. The reselection and access instruction generation unit comprises a clock generation circuit unit, a switching signal generation unit, a radio frequency power amplification unit and a signal switching antenna. The signal processing unit comprises a data transmission processing process, a protocol-data-processing process, a switching signal configuration process and a user information extraction process.

In some examples, the signal sensing and control unit can demodulate a digital signal received through the antenna, and convert the digital signal into recognizable first protocol data. The protocol-data-processing can construct, based upon the received first protocol data, second protocol data for requesting mobile terminal identity information. The second protocol data can be sent through the wireless signal access unit. The user-information-extraction process comprises: transmitting, based upon a response to the second protocol data from the mobile terminal, the protocol data responded by the mobile terminal to the user-information-extraction process to extract the mobile terminal identity information. The background data processing center is configured to generate an actual trip route based upon the mobile terminal identity information acquired by the user information extraction process successively, and calculate a fare based upon start and destination stations. The start and destination stations represent a trip route associated with the mobile terminal. Another example of a data processing center may determine the entry and exit times of a person parking their car in a parking facility and calculate a parking fee.

In some examples, the background-data-processing center comprises a storage unit configured to store the mobile terminal identity information and a station identification code, which have been subject to association processing. For each piece of mobile terminal identity information, the storage unit can respectively and successively store the mobile terminal identity information and the station identification code, which have been subject to association processing.

In some examples, the background data processing center comprises a route matching and management unit configured to perform matching processing on the successively and respectively stored mobile terminal identity information and station identification code, which have been subject to association processing corresponding to each piece of valid mobile terminal identity information, to determine an actual trip route. The background data processing center comprises a charge settlement unit configured to obtain, according to a pre-determined fare calculation program, a fare that a passenger should pay upon completion of the trip.

In some examples, the data transmission processing process is configured to complete modulating and encoding 3GPP protocol data into a digital signal; or to perform demodulation, error correction and decoding on a received digital signal and recover 3GPP protocol data.

In some examples, the protocol data processing process is operable to achieve that the signal intensity of the wireless signal access unit is the strongest within the coverage, i.e., the range of a passage gate.

When entering or exiting guidance routes of a gate passage that is chosen at a corresponding station, an array of terminal-identity-information-collection modules can be disposed along the gate passage to sense signal transmission intensities of a mobile phone simultaneously, and record feedback information about changes in terminal signal intensity of each valid mobile terminal. The peak of the sensed signal intensities transmitted by a valid mobile terminal in a close range is higher than that of the signal intensities radiated by the mobile terminal in a far range.

In some examples, radiated signal intensity peak data can be sensed. The acquired and effectively sensed transmitted signal intensity peak data can be quantified by taking a logarithm with a hyperbolic matching curve.

In some implementations, a system of the present disclosure can determine that the signal intensity of a wireless signal access unit is the strongest within a coverage using the antenna and the signal control unit. Upon determining the signal intensity of a wireless terminal using a collection module of the system, a corresponding gate, that a passenger of the wireless terminal is about to pass through, can then be recognized. The system can open the corresponding gate to let the passenger out, upon successfully completing a fare charging step.

Overall, a wide variety of benefits can be achieved using technologies disclosed in the present disclosure. For example, by disposing a terminal-identity-information-collection module at each station, and sensing a trip of a passenger successively in combination with the present solution, an actual trip route of the passenger can be effectively determined to calculate an actual charge, without requiring the passenger to swipe a card, or insert a coin through a traditional gate machine to get in and get out a station. This can bring a much fast and simpler experience for passengers using subways or railways or a parking facility.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIG. 6 illustrates an exemplary method of smart sensing and facilitating payment of parking fees, in accordance with an implementation of the present technology.

DETAILED DESCRIPTION

Figure 1:
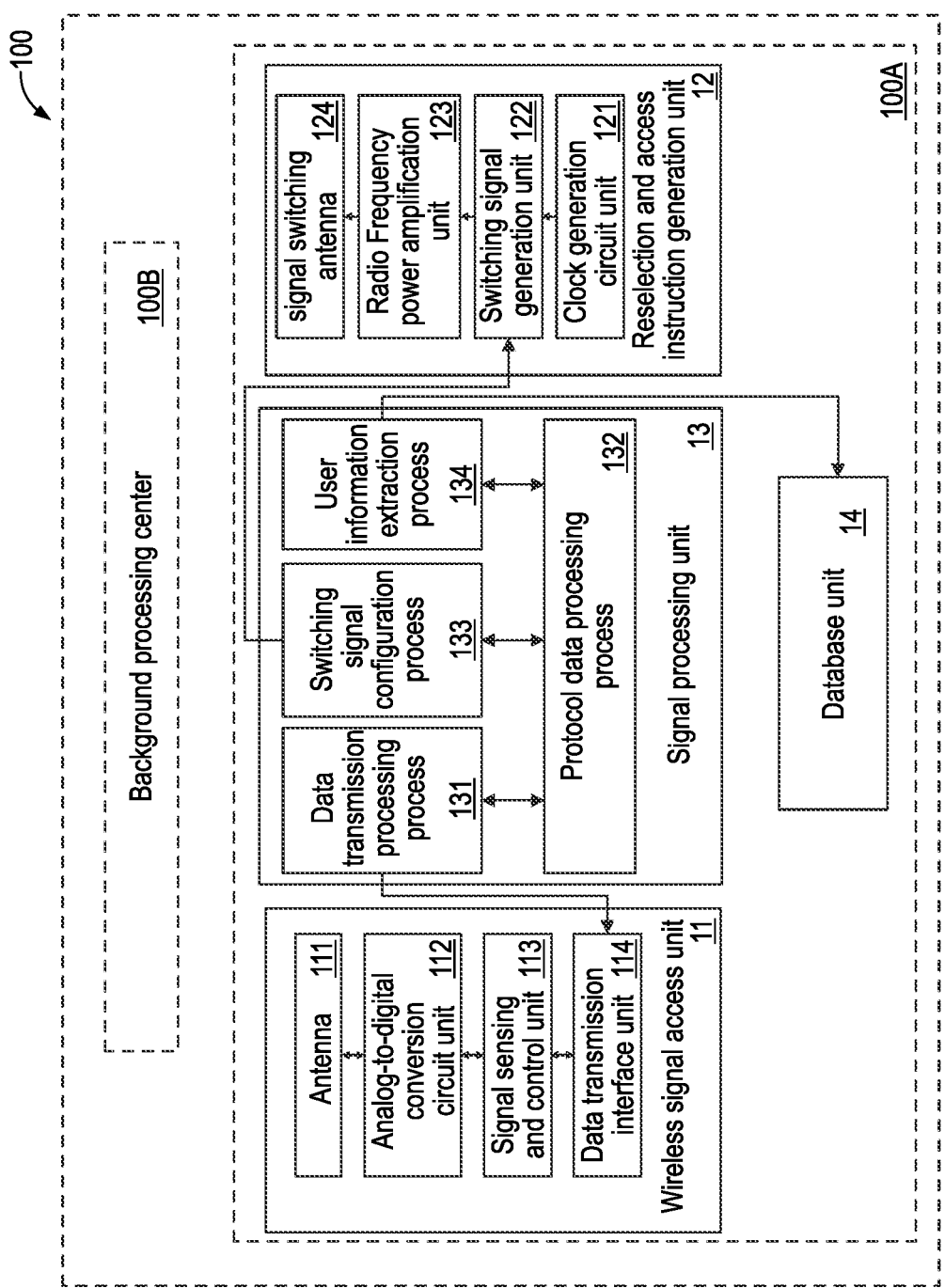
FIG. 1 illustrates a schematic structural diagram of internal functional units in an exemplary terminal-identity-information-collection module, in accordance with an implementation of the present disclosure.

The present disclosure can be embodied in many different forms. There are shown in the drawings, and will herein be described in detail, representative embodiments with the understanding that the present disclosure is to be considered as an exemplification or illustration of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed: the singular includes the plural and vice versa; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Various examples of the present disclosure a mobile sensing and smart payment system. The mobile sensing and smart payment system includes a terminal-identity-information-collection module, and a background data processing center. The background data processing center is configured to successively and respectively trigger, in a suitable time slot, a user information extraction process to extract mobile terminal identity information corresponding to each passenger; based upon extracted mobile terminal information to determine start and destination stations for each passenger; and calculate a charge for each passenger based upon the start and destination stations, and a fee schedule.

FIG. 1 illustrates a schematic structural diagram of internal functional units of an exemplary terminal-identity-information-collection module 100A in a mobile sensing and smart payment system 100, in accordance with an implementation of the present disclosure. In this example, the mobile sensing and smart payment system 100 comprises the terminal-identity-information-collection module 100A, and a background data processing center 100B. The terminal-identity-information-collection module 100A comprises: a wireless signal access unit 11, a reselection and access instruction generation unit 12, a signal processing unit 13 and a database unit 14. In some examples, the system may further comprise one or more target mobile terminals (not shown).

In this example, the wireless signal access unit 11 is connected to the signal processing unit 13 through a data transmission interface unit 114. In some implementations, a universal serial bus communication protocol can be used. The reselection and access instruction generation unit 12 and the system can utilize the universal serial bus communication protocol to achieve data transmission.

In some examples, the wireless signal access unit 11 is configured to send and receive wireless signals to achieve data transmission. The wireless signal access unit 11 comprises an antenna 111, an analog-to-digital conversion circuit unit 112, a signal sensing and control unit 113 and a data transmission interface unit 114.

The workflow of the signal processing unit 13 is operable to extract a mobile user identification code of a user of a mobile terminal, store a mobile terminal user identity, and disconnect the mobile terminal in a communication flow. The signal processing unit 13 comprises a data transmission processing process 131, a protocol data processing process 132, a switching signal configuration process 133 and a user information extraction process 134. The signal processing unit 13 is operable to complete protocol content of a 3GPP base station using software, so that the signal processing unit 13 is capable of performing all functions of a base station. Moreover, based upon the 3GPP protocol, the signal processing unit 13 can modify a base station broadcast parameter and interactive content for communicating with a 3G terminal; connect or disconnect with the mobile terminal; and extract identity information of the user of the mobile terminal.

In some examples, the reselection and access instruction generation unit 12 comprises a clock generation circuit unit 121, a switching signal generation unit 122 to generate a switching signal, a radio frequency power amplification unit 123, and a signal switching antenna 124. The reselection and access instruction generation unit 12 is operable to generate a switching signal, to assist the wireless signal access unit 11 in sensing the mobile terminal to the optimum extent. The data transmission processing process 131 is operable to achieve a USB 2.0 communication protocol, and complete the transceiving of a digital signal with the wireless signal access unit 11. Moreover, the reselection and access instruction generation unit 12 can further complete modulation, demodulation, error correction, encoding and decoding of the digital signal. In some implementations, when sending data, the reselection and access instruction generation unit 12 modulates and encodes the 3GPP protocol data required to be sent, converts the 3GPP protocol data into a digital signal, and send the digital data using USB 2.0. When receiving the data, the reselection and access instruction generation unit 12 performs demodulation, error correction and decoding on the digital signal received using USB 2.0, in order to recover the 3 GPP protocol data.

In some implementations, the protocol data processing process 132 can be divided into three layers based on a wireless communication network standard protocol of open source software, i.e., a physical transmission layer, a data link layer and a network layer. The physical layer can be used to provide a physical ink for transmitting bit streams. The data link layer can establish reliable dedicated data links that are required for message communication between various systems in a wireless communication network. The network layer can be an entity for transceiving and processing a signaling message. The network layer can be further divided into a wireless resource management layer, a mobility management layer and a connection management layer. The wireless resource management layer can establish a data transmission path and a signaling path for a mobile terminal. The mobility management layer can process position information of the mobile terminal. The connection management layer is operable to deal with a routing function. Besides completing the basic content of the wireless communication network protocol, the mobility management layer can enable the signal intensity of the wireless signal access unit 11 to be the strongest within the coverage thereof by modifying parameters of the wireless resource management layer, thus cell reselection would more easily happen on the mobile terminal. Moreover, while cell reselection happens on the mobile terminal, identity information of a mobile terminal user, comprising a mobile user identification code and a mobile device identity code, can be extracted.

The flow of the protocol data processing process 132 can extract the mobile terminal identity information during cell reselection by the mobile terminal. The protocol data processing process 132 is operable to construct new system information, and broadcast and send the new system information through the wireless signal access unit 11. When receiving the broadcast system information, the mobile terminal initiates a cell reselection process according to a cell reselection policy, and sends an access request in a Random Access Channel (RACH) to apply for a Stand-Alone Dedicated Control Channel (SDCCH). In response to the access request, the protocol data processing process 132 can allow access to the channel in a downlink channel. SDCCH channel allocation information is sent to the mobile terminal over an AGCH channel. In other words, the AGCH is used for the device to send an assigned SDCCH to the mobile terminal that has succeeded in random access. The mobile terminal accesses the allocated SDCCH channel and sends a LOCATION UPDATE REQUEST message to request position update. The protocol data processing process 132 constructs an identity recognition IDENTITY REQUEST message, to request the mobile terminal identity information that comprises the mobile user identification code and the mobile device identity code. In response to the identity request, the mobile terminal feeds back the mobile terminal identity information. The protocol data processing process 132 constructs a LOCATION UPDATE ACCEPT message to allow the mobile terminal to access.

The switching signal configuration process 133 is operable to control the generation of a suitable switching signal. The 3G protocol can modify the wireless communication network protocol in terms of base station identity authentication. The wireless communication network protocol does not perform identity authentication on the base station when the mobile terminal accesses the base station, but the 3G protocol can enable the identity authentication on the base station when the mobile terminal accesses the base station. Since the wireless signal access unit 11 has not established communication with the mobile communication service operator, thus cannot perform the identity authentication on the base station by the mobile terminal, the function of the switching signal is to make the mobile terminal be reselected to the wireless signal access unit 11 via the wireless communication network protocol.

The cell reselection procedure of a mobile terminal comprises: causing the mobile terminal to keep measuring the signal quality of one or more cells that surround the mobile terminal, and ranking the one or more cells to select a cell that provides the best quality of service. The switching signal configuration process 133 dynamically influences or interferes the signal quality of the base station, based upon the signal quality of the one or more cells that are located close to the location of the wireless signal access unit 11. As a result, the base station is incapable of providing a stable mobile communication service for the mobile terminal. Therefore, the mobile terminal can be reselected to the wireless communication network base station in turn, to seek a more stable communication service. Since the wireless signal access unit 11 performs the fundamental function of a wireless communication network base station under the control of the protocol data processing process 132, and provides a better signal quality, the reselection of the mobile terminal to the wireless signal access unit 11 can then be achieved. In addition, during the reselection, the mobile terminal can ignore the identity authentication on the base station.

The user information extraction process 134 can be used for extracting and summarizing the user identity information about the mobile terminal, which comprises the mobile user identification code of the mobile terminal user. The mobile user identification code can request from the mobile terminal the mobile user identification code of the user, when the mobile terminal is reselected to the wireless signal access unit 11. The user information extraction process 134 extracts the mobile user identification code of the user from the protocol content processed by the protocol data processing process 132. When the mobile user identification code corresponding to the mobile terminal user is extracted, the user information extraction process stores the mobile user identification code on the database module.

The workflow of the database module is operable to perform writing and reading of the identity information of the mobile terminal user. The database module comprises a data storage process and a data storage space, for conveniently storing and reading the identity information of the mobile terminal user, which comprises the mobile user identification code of the mobile terminal user and the mobile device identity code of the mobile terminal.

The data access process communicates with the signal processing unit 13 to acquire the mobile terminal identity information to be stored in the data storage space, or to read the identity information of the mobile terminal user from the data storage space.

The data storage space stores the mobile terminal identity information in the format of a mobile user identification code and a mobile device identity code.

The device of the present disclosure is applicable for mainstream mobile communication protocols. However, components of systems implementing the present disclosure are not limited to any specific communication protocol. The above discussion is meant to be illustrative of the principles and various examples of the present disclosure. Numerous variations and modifications will become apparent once the above disclosure is fully appreciated.

Figure 2A:
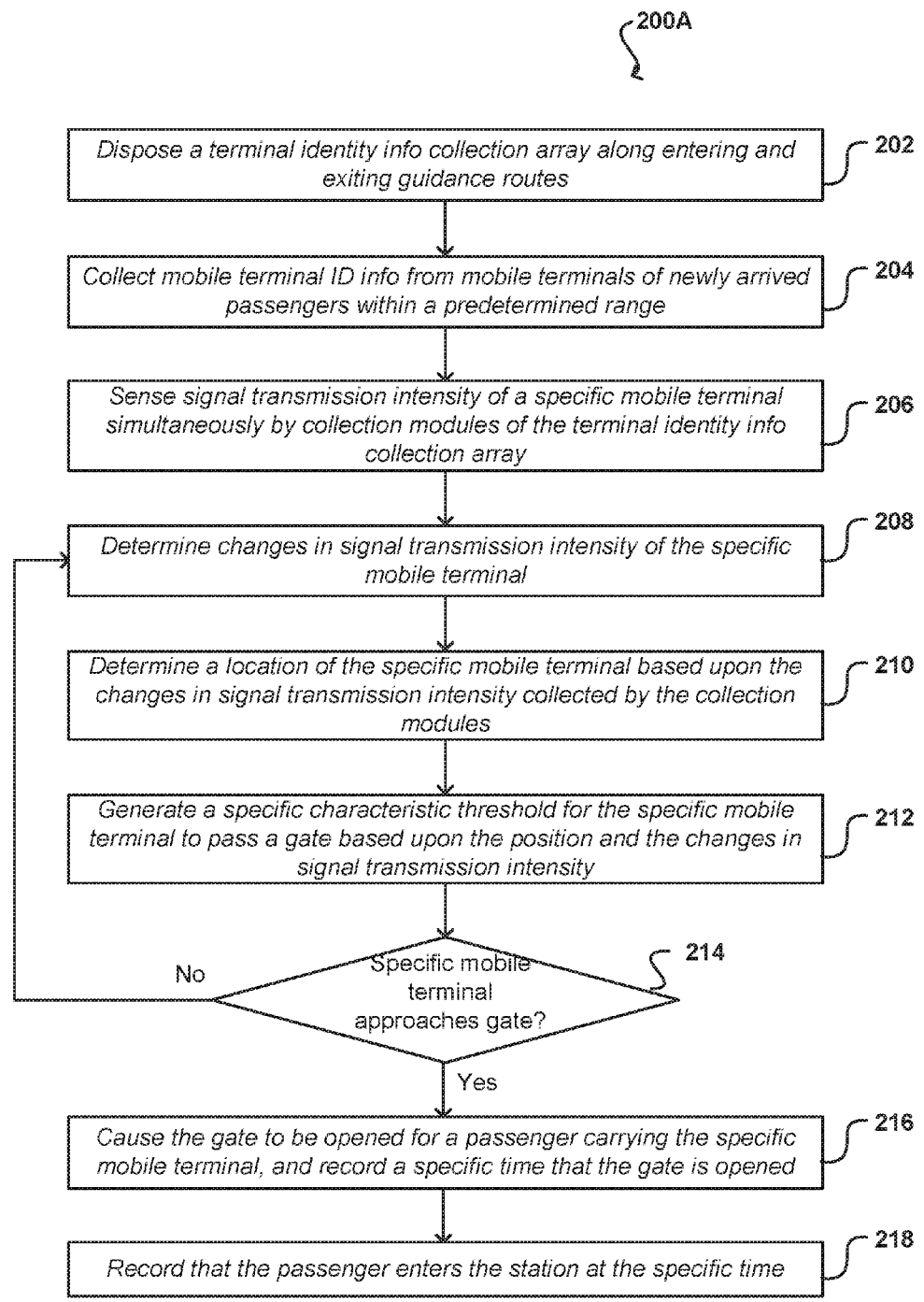
FIG. 2A illustrates an exemplary method of smart sensing and facilitating payment of subway or railway fares, in accordance with an implementation of the present technology.

FIG. 2A illustrates an exemplary method 200A of smart sensing and facilitating payment of a subway or railway fare using a mobile sensing and smart payment system, in accordance with an implementation of the present technology. It should be understood that the exemplary method 200A is presented solely for illustrative purposes and that in other methods in accordance with the present disclosure can include additional, fewer, or alternative steps performed in similar or alternative orders, or in parallel. The exemplary method 200A starts with step 202. At step 202, a terminal-identity-information-collection array can be disposed along entering and exiting guidance routes of a subway or railway station. The terminal-identity-information-collection array can comprise a plurality of terminal-identity-information-collection modules configured to sense mobile terminals, and can be disposed with a predetermined spatial deployment, or a reasonable spatial deployment. In some implementations, hardware commonly used in gate machine passage in subway stations can be used such that smoothly transit can be achieved using existing subway operation facilities.

At step 204, the mobile sensing and smart payment system can collect mobile terminal identification information from mobile terminals of newly arrived passengers in a station. At step 206, the mobile sensing and smart payment system signal can simultaneously sense transmission intensity of a specific mobile terminal using the plurality of terminal-identity-information-collection modules. At step 208, the mobile sensing and smart payment system can determine changes in signal transmission intensity of the specific mobile terminal. At step 210, the mobile sensing and smart payment system can determine a location of the specific mobile terminal based upon the changes in the signal transmission intensity of the specific mobile terminal.

In some examples, a terminal-identity-information-collection module can serve as a read head to identify a mobile phone within proximity. In this disclosure, deployment space information of the plurality of terminal-identity-information-collection modules refers to lineside trace information formed by deploying the array of terminal identity information collection modules disposed in advance along entering and exiting guidance routes of the subway or railway station. In subway stations, the lineside trace information contains a terminal-identity-information-collection module provided at the entrance of a subway station, a plurality of other terminal-identity-information-collection modules provided on a guidance route for guiding into a specified waiting area of each subway line after entering the station, and an end terminal-identity-information-collection module provided in the specified waiting area closest to each subway line. It should be noted that, for the entire mobile sensing and smart payment system, the terminal-identity-information-collection modules, disposed in advance along entering and exiting guidance routes of the subway or railway station, each has a unique valid position information identification code. Thus, the background data processor can determine the movement traces of passengers having entered the station based upon a device code, a position information identification code of each terminal-identity-information-collection module disposed in the station, and terminal identity information sensed by each terminal-identity-information-collection module. Therefore, the background data processor can effectively determine an actual position of a passenger carrying a mobile terminal.

At step 212, the mobile sensing and smart payment system can generate a specific characteristic threshold for the specific mobile terminal to pass an entrance or exit gate of the station, based upon the position of the specific mobile terminal and the changes in the signal transmission intensity of the specific mobile terminal. At step 214, the mobile sensing and smart payment system can make a determination whether the specific mobile terminal is approaching the entrance or exit gate of the station. If the specific mobile terminal is not approaching the entrance or exit gate, the method 200A goes back to step 208.

In response to determining that the specific mobile terminal is approaching the entrance or exit gate within a threshold distance, the mobile sensing and smart payment system can cause the entrance or exit gate to be opened for a passenger carrying the specific mobile terminal, and record a specific time that the gate is opened, at step 216. The mobile sensing and smart payment system can further mark that the passenger has entered or exited the station at the specific time, at step 218.

In some implementations, the last end terminal-identity-information-collection module, disposed in a specified waiting area closest to each subway line, has a higher positioning precision. The last end terminal-identity-information-collection module is operable to recognize that a passenger carrying a valid mobile terminal is approaching a subway gate within a predetermined distance (e.g., 0.5 meters). If the valid mobile terminal carrier is registered and positioned successfully within the predetermined distance, and the gate passage is opened to let the passenger in or out. In an event that the passenger is getting out of the gate, the mobile sensing and smart payment system performs both positioning and fare deduction, and, if successfully, causes the gate to be open to let the passenger out. If unsuccessful, the mobile sensing and smart payment system may perform some prearranged actions, such as starting a background alarm.

It should be noted that, for different mobile terminals, characteristic thresholds for passing through a gate can be different. The proposed solution is to carry out transmitted signal intensity collection and comparison on each valid mobile terminal within a period of time. Applicant has discovered through a large amount of experimental statistics that, when implementing near-range sensing, the peak of the signal intensity radiated by a valid mobile terminal carrier is higher than the signal intensity radiated by the mobile terminal carrier in long-distance sensing. In particular, the system senses radiated signal intensity peak data, and quantifies the acquired and effectively sensed radiated signal intensity peak data by taking the logarithm with a hyperbolic matching curve, and reference may be made to a coordinate plot. By analyzing the quantified data, it can be seen in the plot that the closer the mobile terminal carrier is to the position of a gate machine corresponding to a gate machine identity verification region, the curve is steeper, and the speed of increase is faster; the estimation is more accurate when the distance is smaller, and a peak appears when the distance is zero. By way of sampling, a process of determining a valid mobile terminal carrier passing through the gate may optionally be receiving continuously increasing mobile terminal signal intensity within 3 seconds (the length can be adjusted in experimental tests, t1/t2, with 1 to several seconds as an interval), calculating a change rate in the entire process (within 5 seconds), an absolute change value and a movement speed of the valid mobile terminal carrier theretofore and thereafter, so that it can be determined that a passenger carrying the valid mobile terminal carrier is getting closer to the gate and is the only determined passenger preparing to pass through the gate at this determination moment.

The operation of letting a passenger of the valid mobile terminal carrier out is further executed. That is, after it is determined that the signal peak of the valid mobile terminal carrier has reached the threshold, the gate is opened to only let the valid mobile terminal carrier out, upon the charge is successfully deducted at the same time.

The present disclosure is described in detail above for precisely recognizing real passenger information and determining a valid mobile terminal instantaneously, while keeping gate machine passage hardware facilities commonly used in subway stations at present. Actual subway or railway operation can be complex. Complete trip information of passengers needs to be determined while guaranteeing convenient, rapid and smart travel experience for the passengers, in order to accurately calculate each passenger's fare.

The present disclosure also discloses some implementations, in which it is possible that the machine passage hardware facilities commonly used in subway stations at present are not used. In the implementations, smart sensing and payment are accomplished by performing associated process on smartly sensed terminal identity information and data (e.g., trip information).

Figure 2B:
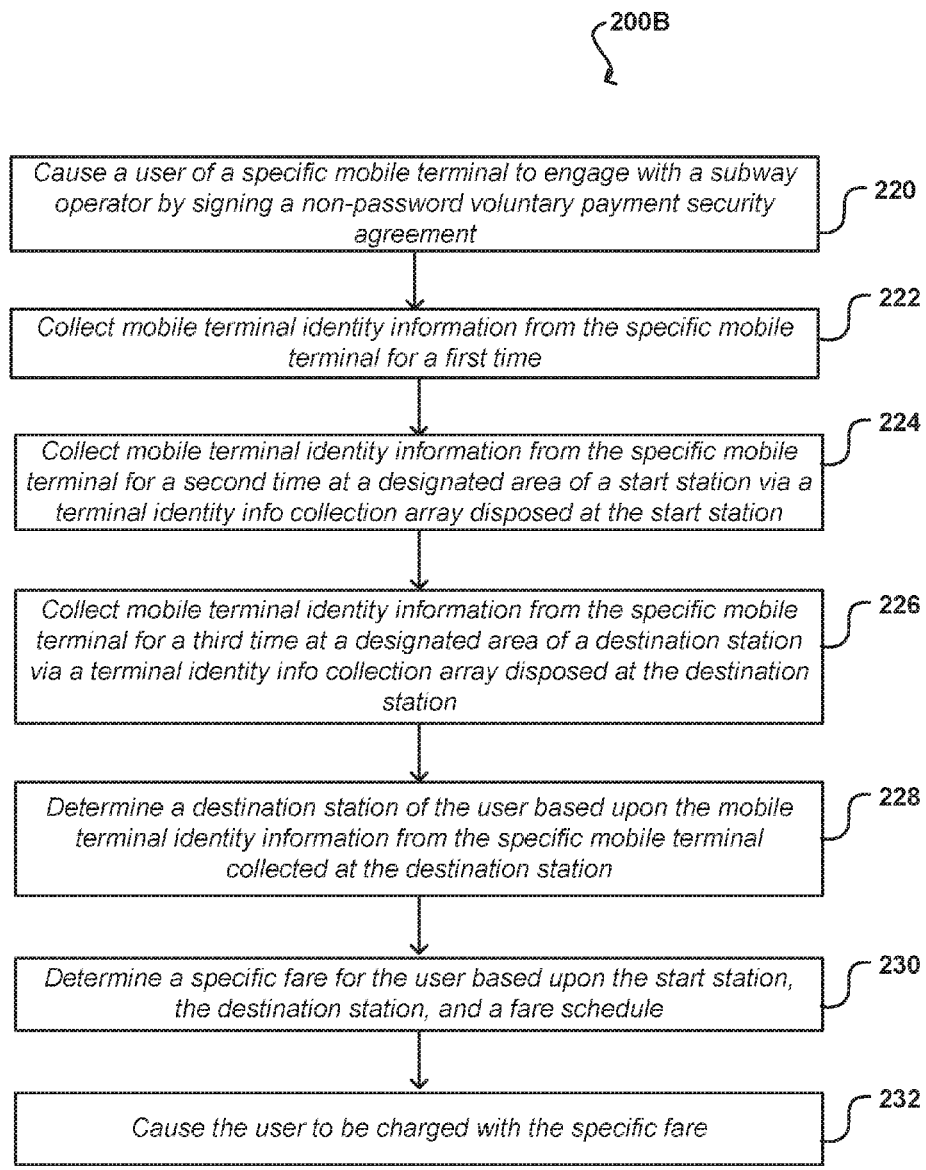
FIG. 2B illustrates another exemplary method of smart sensing and facilitating payment of a fare in a subway or railway system, in accordance with an implementation of the present technology.

FIG. 2B illustrates another exemplary method 200B of smart sensing and facilitating payment of a fare in a subway or railway system, in accordance with an implementation of the present technology. At step 220, a user of a specific mobile terminal can engage with a subway operator by entrusting and signing in advance a non-password voluntary payment security agreement. At step 222, mobile terminal identity information of the specific mobile terminal is collected for a first time.

A passenger's trip can be random and unpredictable. At step 224, the mobile terminal identity information of the specific mobile terminal is collected for a second time at a designated area of a start station via a terminal identity information collection array disposed at the start station, in order to prevent occurrence of invalid operations such as fare deductions due to erroneous determination. Upon executing the step 224, information of the start station is associated with the specific mobile terminal. In some implementations, a management system of the subway system can allocate a unique identification code for each subway station. For example, Window of the World station of line No 1 of Shenzhen subway can be set to 1#001. The present disclosure does not limit the format in allocating unique identification codes for subway stations. The mobile terminal identity information and a station identification code which have been subject to association processing steps 222 and 224 can be delivered together to the background data processing center and stored therein as standby. Once the user gets in the start station, he/she travels to his/her destination station, and gets off after a period of valid trip time.

At step 226, the mobile terminal identity information from the specific mobile terminal is collected for a third time at a designated area of a destination station via a terminal identity information collection array disposed at the destination station. Generally, subway trains arrive at each station according to a prearranged schedule. In some examples, terminal identity information collection array disposed at each subway station can intermittently collect mobile terminal identity information from passengers' mobile terminals according to arrival times of subway trains at corresponding stations. It should be understood that, during a time slot that a train pulls in a station and stay temporarily to allow passengers to get on and off, mobile terminal identity information collected at the station includes mobile terminal identity information of passengers entering the station, and mobile terminal identity information of passengers exiting the station. Upon collection, collected valid mobile terminal identity information can be associated to an identification code of the station, and passed back to the background data processing center substantially in real-time.

At step 228, a destination station of the user can be determined based upon the mobile terminal identity information from the specific mobile terminal collected at the destination. At step 230, a specific fare for the user can be determined based upon the start station, the destination station, and a fare schedule. At step 232, the user is charged with the specific fare.

In some examples, the background data processing center uses a route matching and management unit to perform matching process of data and collected mobile terminal identity information of the specific mobile terminal, and previously stored valid associated data information, based upon each piece of valid mobile terminal identity information associated with the specific mobile terminal. Upon completion of the matching process, the background data processing center can determine the start station and the destination station of the user, and then determine a charge that the user should pay based upon a predetermined fare schedule.

Since the mobile terminal user entrusted and signed the non-password voluntary payment security agreement with the subway operator in advance, and mandates an automatic fare deduction service for valid trips, the background data processing center can require the user to bind a valid account for automatic fare deduction service. The payment process does not need active involvement of the user when the user enters and exits a station. The user's experience for traveling on subway can be worry free and convenient.

For mobile terminal users who have not entrusted and signed a non-password voluntary payment security agreement with the subway operator in advance, they can still use the existing methods entering and exiting stations, i.e., swiping a IC card/ticket or inserting ticket token to get into a start station, and swiping the IC card/ticket or inserting the ticket toke to get out of a destination station.

The description above discloses at least two optionally methods for sensing and paying a trip, which are respectively directed at an area without any gate machine passage and an existing area equipped with a gate machine passage. In both methods, the mobile terminal identity information about the passenger needs to be sensed by a terminal-identity-information-collection array, combined with corresponding station information in substantial real time, and then sent back to data processing center for processing.

Description is made to examples of the present disclosure in conjunction with the accompanying drawings; however, the present disclosure is not limited to the above-mentioned particular examples, and the above-mentioned particular examples are merely illustrative but not limiting. In light of the present disclosure, those of ordinary skill in the art can also make many forms which all fall within the scope of protection of the present disclosure without departing from the principle of the present disclosure and the scope of protection of the claims.

The above discussion is meant to be illustrative of the principles and various examples of the present disclosure. Numerous variations and modifications will become apparent once the above disclosure is fully appreciated.

Figure 3:
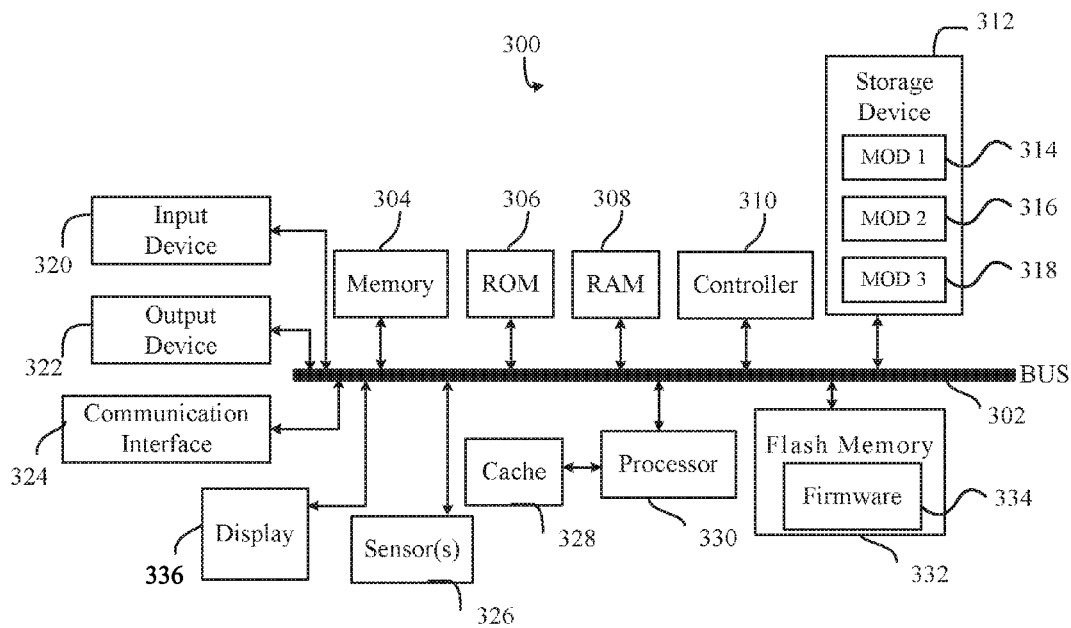
FIG. 3 illustrates an exemplary computing device in accordance with various implementations of the technology.
Figure 4:
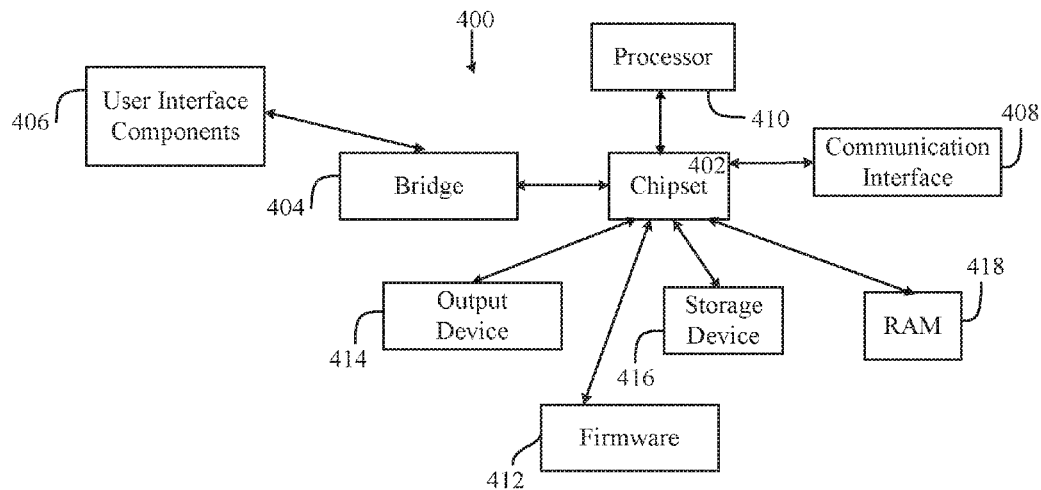
FIG. 4 illustrates an exemplary system in accordance with various examples of the present technology.

A brief introductory description of example systems and networks, as illustrated in FIGS. 3-4, is disclosed herein. These variations shall be described herein as the various examples are set forth. The present disclosure now turns to FIG. 3.

FIG. 3 illustrates an example computing system 300, in which components of the computing system are in electrical communication with each other using a bus 302. The system 300 includes a processing unit (CPU or processor) 330, and a system bus 302 that couples various system components, including the system memory 304 (e.g., read only memory (ROM) 306 and random access memory (RAM) 308), to the processor 330. The system 300 can include a cache of high-speed memory connected directly with, in close proximity to, or integrated as part of the processor 330. The system 300 can copy data from the memory 304 and/or the storage device 312 to the cache 328 for quick access by the processor 330. In this way, the cache can provide a performance boost for processor 330 while waiting for data. These and other modules can control or be configured to control the processor 330 to perform various actions. Other system memory 304 may be available for use as well. The memory 304 can include multiple different types of memory with different performance characteristics. The processor 330 can include any general purpose processor and a hardware module or software module, such as module 1 314, module 2 316, and module 3 318 embedded in storage device 312. The hardware module or software module is configured to control the processor 330, as well as a special-purpose processor where software instructions are incorporated into the actual processor design. The processor 330 may essentially be a completely self-contained computing system, and containing multiple cores or processors, a bus, memory controller, cache, etc. A multi-core processor may be symmetric or asymmetric.

To enable user interaction with the computing device 300, an input device 320 is provided as an input mechanism. The input device 320 can comprise a microphone for speech, a touch-sensitive screen for gesture or graphical input, keyboard, mouse, motion input, and so forth. In some instances, multimodal systems can enable a user to provide multiple types of input to communicate with the system 300. In this example, an output device 322 and a display 336 are also provided. The communications interface 324 can govern and manage the user input and system output.

Storage device 312 can be a non-volatile memory to store data that are accessible by a computer. The storage device 312 can be magnetic cassettes, flash memory cards, solid state memory devices, digital versatile disks, cartridges, random access memories (RAMs) 308, read only memory (ROM) 306, and hybrids thereof.

The controller 310 can be a specialized microcontroller or processor on the system 300, such as a BMC (baseboard management controller). In some cases, the controller 310 can be part of an Intelligent Platform Management Interface (IPMI). Moreover, in some cases, the controller 310 can be embedded on a motherboard or main circuit board of the system 300. The controller 310 can manage the interface between system management software and platform hardware. The controller 310 can also communicate with various system devices and components (internal and/or external), such as controllers or peripheral components, as further described below.

The controller 310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 310 to initiate or conduct specific hardware recovery procedures or operations, as further described below.

The controller 310 can also include a system event log controller and/or storage for managing and maintaining events, alerts, and notifications received by the controller 310. For example, the controller 310 or a system event log controller can receive alerts or notifications from one or more devices and components, and maintain the alerts or notifications in a system event log storage component.

Flash memory 332 can be an electronic non-volatile computer storage medium or chip that can be used by the system 300 for storage and/or data transfer. The flash memory 332 can be electrically erased and/or reprogrammed. Flash memory 332 can include EPROM (erasable programmable read-only memory), EEPROM (electrically erasable programmable read-only memory), ROM, NVRAM, or CMOS (complementary metal-oxide semiconductor), for example. The flash memory 332 can store the firmware 334 executed by the system 300, when the system 300 is first powered on, along with a set of configurations specified for the firmware 334. The flash memory 332 can also store configurations used by the firmware 334.

The firmware 334 can include a Basic Input/Output System or equivalents, such as an EFI (Extensible Firmware Interface) or UEFI (Unified Extensible Firmware Interface). The firmware 334 can be loaded and executed as a sequence program each time the system 300 is started. The firmware 334 can recognize, initialize, and test hardware present in the system 300 based on the set of configurations. The firmware 334 can perform a self-test, such as a POST (Power-on-Self-Test), on the system 300. This self-test can test functionality of various hardware components such as hard disk drives, optical reading devices, cooling devices, memory modules, expansion cards, and the like. The firmware 334 can address and allocate an area in the memory 304, ROM 306, RAM 308, and/or storage device 312, to store an operating system (OS). The firmware 334 can load a boot loader and/or OS, and give control of the system 300 to the OS.

The firmware 334 of the system 300 can include a firmware configuration that defines how the firmware 334 controls various hardware components in the system 300. The firmware configuration can determine the order in which the various hardware components in the system 300 are started. The firmware 334 can provide an interface, such as an UEFI, that allows a variety of different parameters to be set, which can be different from parameters in a firmware default configuration. For example, a user (e.g., an administrator) can use the firmware 334 to specify clock and bus speeds; define what peripherals are attached to the system 300; set monitoring of health (e.g., fan speeds and CPU temperature limits); and/or provide a variety of other parameters that affect overall performance and power usage of the system 300. While firmware 334 is illustrated as being stored in the flash memory 332, one of ordinary skill in the art will readily recognize that the firmware 334 can be stored in other memory components, such as memory 304 or ROM 306.

System 300 can include one or more sensors 326. The one or more sensors 326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 326 can communicate with the processor, cache 328, flash memory 332, communications interface 324, memory 304, ROM 306, RAM 308, controller 310, and storage device 312, via the bus 302, for example. The one or more sensors 326 can also communicate with other components in the system via one or more different means, such as inter-integrated circuit (I2C), general purpose output (GPO), and the like. Different types of sensors (e.g., sensors 326) on the system 300 can also report to the controller 310 on parameters, such as cooling fan speeds, power status, operating system (OS) status, hardware status, and so forth.

FIG. 4 illustrates an example computer system 400 having a chipset architecture that can be used in executing the described method(s) or operations, and in generating and displaying a graphical user interface (GUI). Computer system 400 can include computer hardware, software, and firmware that can be used to implement the disclosed technology. System 400 can include a processor 410, representative of a variety of physically and/or logically distinct resources capable of executing software, firmware, and hardware configured to perform identified computations. Processor 410 can communicate with a chipset 402 that can control input to and output from processor 410. In this example, chipset 402 outputs information to output device 414, such as a display, and can read and write information to storage device 416, which can include magnetic media, and solid state media, for example. Chipset 402 can also read data from and write data to RAM 418. A bridge 404 for interfacing with a variety of user interface components 406, can be provided for interfacing with chipset 402. Such user interface components 406 can include a keyboard, a microphone, touch detection and processing circuitry, a pointing device, such as a mouse, and so on. In general, inputs to system 400 can come from any of a variety of sources, machine generated and/or human generated.

Chipset 402 can also interface with one or more communication interfaces 408 that can have different physical interfaces. Such communication interfaces can include interfaces for wired and wireless local area networks, for broadband wireless networks, and for personal area networks. Further, the machine can receive inputs from a user via user interface components 406 and execute appropriate functions, such as browsing functions by interpreting these inputs using processor 410.

Moreover, chipset 402 can also communicate with firmware 412, which can be executed by the computer system 400 when powering on. The firmware 412 can recognize, initialize, and test hardware present in the computer system 400 based on a set of firmware configurations. The firmware 412 can perform a self-test, such as a POST, on the system 400. The self-test can test the functionality of the various hardware components 402-418. The firmware 412 can address and allocate an area in the memory 418 to store an OS. The firmware 412 can load a boot loader and/or OS, and give control of the system 400 to the OS. In some cases, the firmware 412 can communicate with the hardware components 402-410 and 414-418. Here, the firmware 412 can communicate with the hardware components 402-410 and 414-418 through the chipset 402, and/or through one or more other components. In some cases, the firmware 412 can communicate directly with the hardware components 402-410 and 414-418.

It can be appreciated that example systems 300 and 400 can have more than one processor (e.g., 330, 410), or be part of a group or cluster of computing devices networked together to provide greater processing capability.

Figure 5:
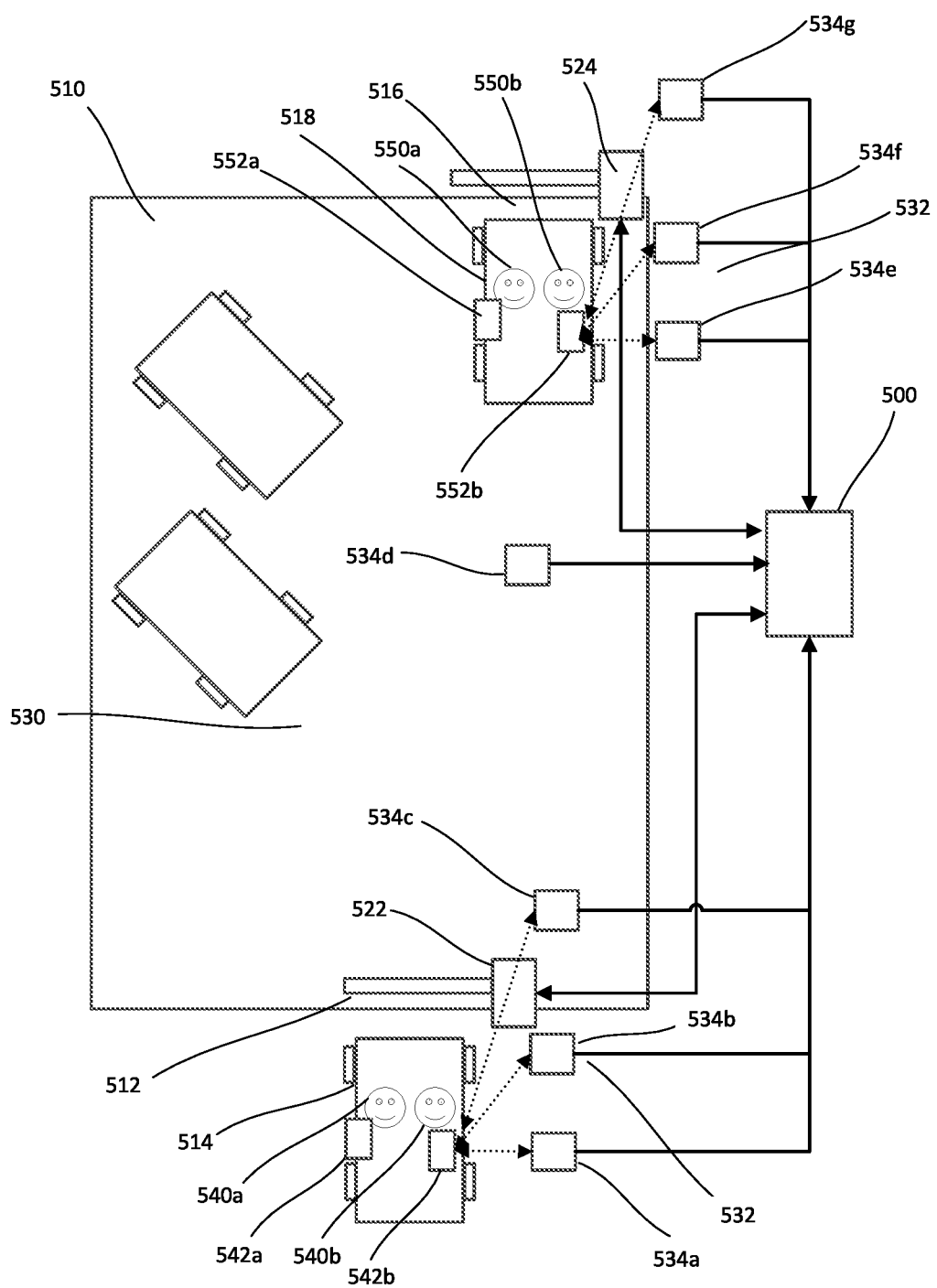
FIG. 5 illustrates another example implementation for tracking of parking fees.

Another implementation of the above described principles may be for facilitating the collection of parking fares. FIG. 5 shows an example mobile sensing and smart payment system 500 in a parking facility 510 having an entrance route 512 for the entry of vehicles such as a car 514 and an exit route 516 for the exit of vehicles such as a car 518. The parking facility 510 has a number of parking spaces in a parking area 520 that is vehicle accessible via the entrance 512 and exit 516 for other vehicles that use the facility 510 for parking.

In this example, the entrance route 512 includes a physical entrance gate 522. The exit route 514 includes a physical exit gate 524. There is an array 532 of terminal identity information collection modules such as collection modules 534*a*, 534*b*, 534*c*, 534*d*, 534*e*, 534*f*, and 534*g* throughout the parking facility 510 including modules in proximity to the entrance route 512, parking area 520, and exit route 516. The collection modules 534*a*-534*g* can be disposed with a predetermined spatial deployment or a reasonable spatial deployment relative to locations in the parking facility 510. Each of terminal identity information collection modules 534*a*-534*g* is similar to the module 100A described above in reference to FIG. 1. Thus, each of the collection modules 534*a*-534*g* includes a wireless signal access unit configured to operate a mobile terminal identity information extraction program, a reselection and access-instruction-generation unit configured to generate and transmit a switching signal for establishing a connection between the specific mobile terminal and the wireless signal access unit, and a signal processing unit configured to control the reselection and access-instruction-generation unit to generate a switching signal.

The mobile sensing and smart payment system 500 includes a database with registered persons that may include the persons such as passengers in the cars 514 and 518. The system 500 includes a background data processing center that processes signals from the terminal identity information collection modules of the array 532 to determine the identification of detected mobile terminals. In some implementations, hardware commonly used in gate machine passage in parking lots can be used such that smoothly transit can be achieved using existing parking lot operation facilities. Thus, the gate open and closed mechanism control of the gates 522 and 524 may be integrated with the example system 500 to open the gates 522 and 524 automatically when fare information is collected.

In this example, the car 514 may include passengers 540*a* and 540*b* with corresponding mobile devices 542*a* and 542*b*. The exiting car 518 may also include passengers 550*a* and 550*b* with corresponding mobile devices 552*a* and 552*b*. Similar to the mobile devices and terminals described here, the mobile devices mobile terminal periodically perform cell reselection to a base station of a wireless communication network using standard communication protocols. Each of the mobile terminal may communicate messages with other mobile terminals in the wireless communication network. The wireless communication network includes multiple base stations relaying message communications between mobile terminals. At least one of the passenger or passengers in the car 518 are registered in a database accessible to the system 500. Once the corresponding mobile device is identified, a parking fee is charged to the identified passenger. In the case that there are multiple registered passengers in the vehicle, there is a priority marked with each person in the database and the fee may be charged to the passenger with the highest priority. Alternatively, one passenger or all passenger may be alerted to accept the fee to their account.

The array of terminal identity information collection modules 532 may include an end terminal identity information collection module such as the collection module 524*d* that disposed at a specified area that is closest to the parking area 520 of the parking facility 510 In this example, the end terminal identity information collection module 524*d* has a higher positioning precision than remaining terminal identity information collection modules.

The example parking fee collection process uses the mobile sensing and smart payment system 500, in accordance with an implementation of a present method 600 in FIG. 6 is presented solely for illustrative purposes and that in other methods in accordance with the present disclosure can include additional, fewer, or alternative steps performed in similar or alternative orders, or in parallel. The exemplary method 600 starts with step 602. At step 602, a terminal identity information collection array can be disposed along entering and exiting guidance routes of a parking lot or parking structure such as the parking facility 510 in FIG. 5. The terminal identity information collection array includes a plurality of terminal identity information collection modules such as those explained above in reference to FIG. 1 configured to sense mobile terminals. As explained above, the collection modules are deployed on the entrance route 512 and the exit route 516.

At step 604, the mobile sensing and smart payment system 500 can collect mobile terminal identification information from mobile terminals of newly arrived passengers inside a vehicle from the collection modules 534*a*-534*g*. At step 606, the mobile sensing and smart payment system signal can simultaneously sense transmission intensity of a specific mobile terminal using the terminal identity information collection modules 534*a*-534*g* in FIG. 5. At step 608, the mobile sensing and smart payment system 500 can determine changes in signal transmission intensity of the specific mobile terminal. At step 610, the mobile sensing and smart payment system 500 can determine a location of the specific mobile terminal based upon the changes in the signal transmission intensity of the specific mobile terminal.

In some examples, a terminal identity information collection module can serve as a read head to identify a mobile phone within proximity of the module. In this example, deployment space information of the plurality of terminal identity information collection modules refers to lineside trace information formed by deploying the array of terminal identity information collection modules disposed in advance along entering and exiting guidance routes of the parking facility 510. It should be noted that for the entire mobile sensing and smart payment system 500, the terminal identity information collection modules, disposed in advance along entering and exiting guidance routes of the parking lot or parking structure, each have a unique valid position information identification code. Thus, the background data processor can determine the movement traces of passengers in the vehicle that entering the parking facility 510 based upon a device code, a position information identification code of each terminal identity information collection module disposed in the parking facility 510, and terminal identity information sensed by each terminal identity information collection module. Therefore, the background data processor can effectively determine an actual position of a passenger carrying a mobile terminal in the vehicle such as the passengers 540*a* and 540*b*.

At step 612, the mobile sensing and smart payment system can generate a specific characteristic threshold for the specific mobile terminal to pass an entrance or exit gate, based upon the position of the specific mobile terminal and the changes in the signal transmission intensity of the specific mobile terminal. At step 614, the mobile sensing and smart payment system 500 can make a determination whether the specific mobile terminal is approaching the entrance or exit gate of the parking facility 510. If the specific mobile terminal is not approaching the entrance or exit gate, the method 600 goes back to step 608.

In response to determining that the specific mobile terminal is approaching the entrance or exit gate within a threshold distance (614), the mobile sensing and smart payment system 500 can cause the entrance or exit gate to be opened for a passenger carrying the specific mobile terminal in the vehicle, and record a specific time that the gate is opened, at step 616. The mobile sensing and smart payment system can further mark that the passenger has entered or exited the parking lot at the specific time, at step 618. The terminal identity information collection module is operable to recognize that a passenger carrying a valid mobile terminal is approaching an exit gate of a parking lot within a predetermined distance (e.g., 5 meters). For example, a mobile terminal may be valid if the passenger has an account for parking fares registered with the system 500. If the valid mobile terminal carrier is registered and positioned successfully within the predetermined distance, the gate passage is opened to let the vehicle in or out. In an event that the vehicle is exiting out of the exit gate 524, the mobile sensing and smart payment system 500 performs both positioning and parking fee deduction (620). The parking fee is calculated for the passenger based upon the start and exit times, and a fee schedule. If the parking fee deduction is successful, the system 500 causes the gate 524 to be opened to let the vehicle out. If unsuccessful, the mobile sensing and smart payment system 500 may perform some prearranged action, such as starting a background alarm, or alerting the mobile terminal to try manual entry of payment for the parking fee.

It should be noted that for different mobile terminals, characteristic thresholds for passing through a gate can be different. The example system 500 thus carries out transmitted signal intensity collection and comparison on each valid mobile terminal within a period of time. When implementing near range sensing, the peak of the signal intensity radiated by a valid mobile terminal carrier is higher than the signal intensity radiated by the mobile terminal carrier in long distance sensing. In particular, the system 500 senses radiated signal intensity peak data, and quantifies the acquired and effectively sensed radiated signal intensity peak data by taking the logarithm with a hyperbolic matching curve, and reference may be made to a coordinate plot. By analyzing the quantified data, it can be seen in the plot that the closer the mobile terminal carrier is to the position of a gate machine corresponding to a gate machine identity verification region, the curve is steeper, and the speed of increase is faster; the estimation is more accurate when the distance is smaller, and a peak appears when the distance is zero. By way of sampling, a process of determining a valid mobile terminal carrier passing through the gate may optionally be receiving continuously increasing mobile terminal signal intensity within 3 seconds (the length can be adjusted in experimental tests, t1/t2, with 1 to several seconds as an interval), calculating a change rate in the entire process (within 5 seconds), an absolute change value and a movement speed of the valid mobile terminal carrier theretofore and thereafter, so that it can be determined that a passenger carrying the valid mobile terminal carrier is getting closer to the gate and is the only determined passenger preparing to pass through the gate at this determination moment.

The operation of letting a person with the valid mobile terminal out of the parking facility is further executed after it is determined that the signal peak of the valid mobile terminal has reached the threshold. When the signal peaked has reached the threshold, the gate is opened to only let the valid mobile terminal out. The charge is successfully deducted at the same time from the passenger associated with the mobile terminal.

For clarity of explanation, in some instances, the present disclosure may be presented as including individual functional blocks including functional blocks, including devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discrete logic circuit(s) having logic gates for implementing logic functions upon data signals; an application specific integrated circuit (ASIC) having appropriate combinational logic gates; programmable hardware such as a programmable gate array(s) (PGA); and/or a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C# or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including storage media and computing media. The storage media and computing media can include, but are not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage, or other magnetic storage devices that can be used to store the desired information and that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computer-implemented method for facilitating payment of a parking fee, comprising:
    disposing a terminal identity information collection array along entering and exiting routes at a parking facility, the terminal identity information collection array comprising a plurality of terminal identity information collection modules, each comprising a wireless signal access unit configured to operate a mobile terminal identity information extraction program, a reselection and access-instruction-generation unit configured to generate and transmit a switching signal, and a signal processing unit configured to control the reselection and access-instruction-generation unit to generate the switching signal; wherein a specific mobile terminal periodically performs cell reselection to a base station of a wireless communication network using standard communication protocols, wherein the mobile terminal communicates messages with other mobile terminals in the wireless communication network, and wherein the wireless communication network includes multiple base stations relaying message communications between mobile terminals; and wherein the switching signal transmitted by the reselection and access-instruction unit initiates reselection by the specific mobile terminal to establish a connection between the specific mobile terminal and the wireless signal access unit and interferes with any other base stations that may be reselected by the specific mobile terminal;
    receiving mobile terminal identification information in the course of a specific mobile terminal periodically performing cell reselection;
    collecting mobile terminal identification information from the specific mobile terminal performing cell reselection, wherein the specific mobile terminal is of a newly arrived person in a vehicle arriving at the parking facility;
    simultaneously sensing transmission intensity of a specific mobile terminal using the plurality of terminal identity information collection modules;
    determining changes in signal transmission intensity of the specific mobile terminal via a mobile terminal sensing system;
    determining a location of the specific mobile terminal based upon the changes in the signal transmission intensity of the specific mobile terminal;
    generating a specific characteristic threshold for the specific mobile terminal to pass an entrance gate of the parking facility, based upon the position of the specific mobile terminal and the changes in the signal transmission intensity of the specific mobile terminal via the mobile terminal sensing system;
    determining that the specific mobile terminal is approaching the entrance gate of the parking facility via the mobile terminal sensing system;
    causing the entrance gate of the start station to be opened for the person carrying the specific mobile terminal, and recording a specific time that the entrance gate of the parking facility is opened for the specific mobile terminal; and
    recording that the person carrying the specific mobile terminal has entered the parking facility at the specific time via the mobile terminal sensing system.

2. The computer-implemented method of claim 1, wherein the plurality of terminal identity information collection modules is disposed with a predetermined spatial deployment.

3. The computer implemented method of claim 1, wherein the plurality of terminal identity information collection modules each has a unique valid position information identification code.

4. The computer-implemented method of claim 3, wherein the plurality of terminal identity information collection modules includes an end terminal identity information collection module disposed at an area that is closest to a parking area of the parking facility.

5. The computer-implemented method of claim 4, wherein the end terminal identity information collection module has a higher positioning precision than remaining terminal identity information collection modules of the plurality of terminal identity information collection modules.

6. The computer-implemented method of claim 5, wherein the end terminal identity-information collection module is operable to recognize that the person carrying the specific mobile terminal is approaching the entrance gate of the parking facility within a predetermined distance.

7. The computer-implemented method of claim 1, wherein determining that the specific mobile terminal is approaching the entrance gate of the start station comprises:
receiving continuously increasing mobile terminal signal intensity from the specific mobile terminal within a predetermined time period; and
calculating a change rate of the mobile terminal signal intensity from the specific mobile terminal within the predetermined time period, an absolute change value of the mobile terminal signal intensity, and a movement speed of the specific mobile terminal.

8. The computer-implemented method of claim 1, wherein the mobile sensing and smart payment system includes a terminal identity information collection module, and a background data processing center.

9. The computer-implemented method of claim 8, wherein the background data processing center is configured to successively and respectively trigger, in a time slot, a user information extraction process to extract mobile terminal identity information corresponding to the specific mobile terminal; determine the entry time and an exit time for the person carrying the specific mobile terminal based upon extracted mobile terminal information; and calculate a parking fee for the person based upon the entry and exit times, and a fee schedule.

10. A mobile sensing and payment system, comprising:
a terminal identity information collection array along an entrance route and an exit route of a parking facility, the terminal identity information collection array comprising a plurality of terminal identity information collection modules, each comprising a wireless signal access unit configured to operate a mobile terminal identity information extraction program, a reselection and access-instruction-generation unit configured to generate and transmit a switching signal, and a signal processing unit configured to control the reselection and access-instruction-generation unit to generate the switching signal;
a background data processor coupled to the terminal identity information collection array, the background data processor configured to:
collect mobile terminal identification information from a specific mobile terminal performing cell reselection, wherein the specific mobile terminal is of a newly arrived person at the entrance route, wherein the specific mobile terminal periodically performs cell reselection to a base station of a wireless communication network using standard communication protocols, wherein the mobile terminal communicates messages with other mobile terminals in the wireless communication network, wherein the wireless communication network includes multiple base stations relaying message communications between mobile terminals, and wherein the specific mobile terminal transmits mobile terminal identification information in the course of the specific mobile terminal periodically performing cell reselection; and wherein the switching signal transmitted by the reselection and access-instruction unit initiates reselection by the specific mobile terminal to establish a connection between the specific mobile terminal and the wireless signal access unit and interferes with any other base stations that may be reselected by the specific mobile terminal;
simultaneously sense transmission intensity of the specific mobile terminal using the plurality of terminal identity information collection modules;
determine changes in signal transmission intensity of the specific mobile terminal;
determine a location of the specific mobile terminal based upon the changes in the signal transmission intensity of the specific mobile terminal;
generate a specific characteristic threshold for the specific mobile terminal to pass an entrance gate at the entrance route, based upon the position of the specific mobile terminal and the changes in the signal transmission intensity of the specific mobile terminal;
determine that the specific mobile terminal is approaching the entrance gate;
cause the entrance gate to be opened for a person carrying the specific mobile terminal, and recording a specific time that the entrance gate is opened for the specific mobile terminal; and
record that a person carrying the specific mobile terminal has entered the parking facility at the specific time.

11. The system of claim 10, wherein the plurality of terminal identity information collection modules is disposed with a predetermined spatial deployment.

12. The system of claim 10, wherein the plurality of terminal identity information collection modules each has a unique valid position information identification code.

13. The system of claim 12, wherein the plurality of terminal identity information collection modules includes an end terminal identity information collection module disposed at a specified area that is closest to a parking area of the parking facility.

14. The system of claim 13, wherein the end terminal identity information collection module has a higher positioning precision than remaining terminal identity information collection modules of the plurality of terminal identity information collection modules.

15. The system of claim 14, wherein the end terminal identity information collection module is operable to recognize that the person carrying the specific mobile terminal is approaching the entrance gate within a predetermined distance.

16. The system of claim 10, wherein determining that the specific mobile terminal is approaching the entrance gate of the start station comprises:
receiving continuously increasing mobile terminal signal intensity from the specific mobile terminal within a predetermined time period; and
calculating a change rate of the mobile terminal signal intensity from the specific mobile terminal within the predetermined time period, an absolute change value of the mobile terminal signal intensity, and a movement speed of the specific mobile terminal.

17. The system of claim 10, wherein the mobile sensing and payment system wherein the background data processing processor is configured to successively and respectively trigger, in a time slot, a user information extraction process to extract mobile terminal identity information corresponding to the specific mobile terminal; determine the entry time and an exit time for the person carrying the specific mobile terminal based upon extracted mobile terminal information; and calculate a parking fee for the person based upon the entry and exit times and a fee schedule.

18. A non-transitory computer-readable storage medium including instructions that, when executed by at least one processor of a mobile sensing and payment system, cause the mobile sensing and smart system to perform operations comprising:

collecting mobile terminal identification information from a specific mobile terminal performing cell reselection via a terminal identity information collection array comprising a plurality of terminal identity information collection modules, each comprising a wireless signal access unit configured to operate a mobile terminal identity information extraction program, a reselection and access-instruction-generation unit configured to generate and transmit a switching signal, and a signal processing unit configured to control the reselection and access-instruction-generation unit to generate the switching signal; wherein the specific mobile terminal is of a newly arrived person at an entrance route of a parking facility, wherein the specific mobile terminal periodically performs cell reselection to a base station of a wireless communication network using standard communication protocols, wherein the mobile terminal communicates messages with other mobile terminals in the wireless communication network, wherein the wireless communication network includes multiple base stations relaying message communications between mobile terminals, and wherein the specific mobile terminal transmits mobile terminal identification information in the course of the specific mobile terminal periodically performing cell reselection; and wherein the switching signal transmitted by the reselection and access-instruction unit initiates reselection by the specific mobile terminal to establish a connection between the specific mobile terminal and the wireless signal access unit and interferes with any other base stations that may be reselected by the specific mobile terminal;

simultaneously sensing transmission intensity of the specific mobile terminal using the plurality of terminal identity information collection modules;

determining changes in signal transmission intensity of the specific mobile terminal;

determining a location of the specific mobile terminal based upon the changes in the signal transmission intensity of the specific mobile terminal;

generating a specific characteristic threshold for the specific mobile terminal to pass an entrance gate of the parking facility, based upon the position of the specific mobile terminal and the changes in the signal transmission intensity of the specific mobile terminal;

determining that the specific mobile terminal is approaching the entrance gate;

causing the entrance gate to be opened for the person carrying the specific mobile terminal, and recording a specific entry time that the entrance gate is opened for the specific mobile terminal; and recording that the person carrying the specific mobile terminal has entered the parking facility at the specific time.

* * * * *